United States Patent [19]

Howe

[11] Patent Number: 4,740,251

[45] Date of Patent: Apr. 26, 1988

[54] METHOD FOR IMPROVING MAGNESIUM OXIDE STEEL COATINGS

[75] Inventor: Michael W. Howe, Pittsburgh, Pa.

[73] Assignee: Calgon Corporation, Pittsburgh, Pa.

[21] Appl. No.: 945,263

[22] Filed: Dec. 22, 1986

[51] Int. Cl.$^4$ .............................................. B23K 35/24

[52] U.S. Cl. ................................ 148/6.14 R; 148/6.2; 148/113

[58] Field of Search .................... 148/6.2, 6.14 R, 113

[56] References Cited

U.S. PATENT DOCUMENTS

| | | | |
|---|---|---|---|
| 3,941,621 | 3/1976 | Lee | 148/113 |
| 3,959,034 | 5/1976 | Akerblom | 148/6.14 R |
| 4,287,006 | 9/1981 | Hiromae | 148/113 |
| 4,512,823 | 4/1985 | Howe | 148/113 |

*Primary Examiner*—Sam Silverberg

*Attorney, Agent, or Firm*—W. C. Mitchell; M. C. Sudol, Jr.

[57] ABSTRACT

This invention is directed to improved magnesium oxide slurries for use in coating silicon steels prior to high temperature annealing, comprising a calcination-modified magnesium oxide and water. Inorganic salts of barium, chromium, silicon, zinc or aluminum are added to magnesium hydroxide prior to calcination, resulting in a calcined magnesium oxide product having improved properties.

This invention is also directed to an improved process for coating silicon steel, using the above described improved magnesium oxide product.

4 Claims, No Drawings

METHOD FOR IMPROVING MAGNESIUM OXIDE STEEL COATINGS

BACKGROUND OF THE INVENTION

In many fields of use and, in particular, in the electrical industry, it is necessary to coat a ferrous metal. Such a coating desirably performs the function of separating and purifying the ferrous material and reacting with surface silica in the steel to form an electrical insulating layer.

For example, in the transformer art, the cores of transformers are usually formed of a ferrous material, such as silicon steel, which may be provided with a preferred grain growth orientation through annealing to provide optimal electrical and magnetic properties. It is necessary to provide a coating on the ferrous material prior to the final high temperature grain growth anneal. This coating performs three functions, including: separating the various turns or layers of the coiled material to prevent their sticking or welding together during high temperature annealing; aiding in the chemical purification of the ferrous material to develop desired optimum characteristics of the metal; and forming on the surface of the ferrous material being treated a refractory-type coating which electrically insulates one layer of ferrous material from the next during its use as a transformer or an electrical aparatus such as a motor armature or the like.

In the present state of the electrical apparatus art, the most widely used coating for a ferrous-containing material is a coating of magnesium oxide and/or magnesium hydroxide. These coatings are generally applied to the ferrous material in the form of a slurry or suspension of magnesium oxide and/or magnesium hydroxide in water. The slurry or suspension (slurry and suspension are used synonomously herein) comprises a quantity of magnesium oxide or magnesium hydroxide in water and is mixed sufficiently for the desired application; the magnesium oxide may be hydrated to an extent depending on the character of the oxide used, the duration of mixing and the temperature of the suspension or slurry.

As set forth in U.S. Pat. No. 2,385,332, during heat treatment at suitable temperatures, magnesium oxide can be caused to react with silica particles on or near the surface of a previously oxidized silicon-iron sheet stock to form a glass-like coating. Such coatings are useful as interlaminary insulators when silicon-iron sheets are used in electrical apparatuses, as for example in the core of a transformer.

In the production of silicon steel for the magnetic cores of transformers, the steel is generally annealed to provide optimum grain growth orientation which develops the magnetic properties of silicon steel. This anneal, which is usually carried out in a dry hydrogen atmosphere at high temperatures, also aids in purifying the steel. During annealing, the magnesium oxide in the added slurry or suspension reacts with silica on the surface of the silicon steel to form a glass-like coating of magnesium silicate. This glass-like coating provides electrical insulation during the use of the silicon steel in electrical apparatuses.

U.S. Pat. No. 4,512,823 describes magnesium oxide compositions which eliminate "tight magnesia", i.e., excess magnesium oxide which adheres tightly to the annealed coating (glass film) formed on silicon steel, while minimizing the hydration rate in the aqueous coating bath. More particularly, a portion of the magnesium oxide in the coating slurry or suspension reacts with the surface silica to form a glass-like magnesium silicate coating, while the unreacted portion remains as excess magnesium oxide which must be removed prior to further processing. Generally, this removal is accomplished by mechanical scrubbing with nylon bristle brushes or the like. After scrubbing, if there is a residue, it is termed "tight magnesia" and is undesirable. The method of the U.S. Pat. No. 4,512,823 utilizes admixtures of barium oxide, barium nitrate, chromium nitrate, or their hydrates with magnesium oxide in a slurry to minimize the formation of "tight magnesia", thereby improving the stacking factor of the steel and improving production yield by lessening the quantities of unacceptable steel caused by "tight magnesia" deposits.

The instant invention represents a further improvement of the U.S. Pat. No. 4,512,823 method. More particularly, an improved, calcination-modified magnesium oxide is prepared by adding barium, lithium, silicon, chromium, zinc or aluminum salts to a magnesium hydroxide slurry, prior to calcination, and then calcining. These salts produce a calcination-modified magnesium oxide, which, when used in steel coating slurries, prevents the occurrence of tight magnesia and improves the quality of the glassy film formed on silicon steels.

The distinction between this invention and the method of the U.S. Pat. No. 4,512,823 is that the instant additives are added prior to calcination, while the additives of the U.S. Pat. No. 4,512,823 are merely blended with calcined magnesium oxide in the coating slurry. Pre-calcination addition of the instant additives enhances the sintering of magnesium hydroxide during calcination. Enhancement of sintering during production of a calcined magnesium oxide product reduces "tight magnesia" when the calcination-modified magnesium oxide is used to coat silicon steel. This occurs because increased sintering during calcination reduces sintering during annealing.

DESCRIPTION OF THE INVENTION

The instant invention is directed to an improved slurry for use in the initial coating of silicon steel prior to high temperature annealing, comprising: (a) 8–15%, by weight, of a calcination-modified magnesium oxide; and (b) the balance water, wherein said calcination-modified magnesium oxide is prepared by adding an effective amount of a compound selected from the group consisting of barium salts, lithium salts, silica salts, chromium salts, zinc salts and aluminum salts, including hydrates thereof, preferably barium hydroxide, hydrates of barium hydroxide, barium nitrate, hydrates of barium nitrate, barium phosphate, lithium nitrate, lithium fluoride, barium carbonate, pyrogenic silica, chromium nitrate, zinc oxide and aluminum oxide, to magnesium hydroxide prior to calcination, and the calcining, thereby enhancing sintering of magnesium hydroxide during calcination and minimizing sintering of the calcined magnesium oxide product during high temperature annealing.

The instant invention is also directed to an improved process for coating silicon steel, comprising coating the steel with a calcination-modified magnesium oxide slurry prior to high temperature annealing, wherein said calcination-modified magnesium oxide is prepared by adding an effective amount of a compound selected from the group consisting of barium salts, lithium salts, silica salts, chromium salts, zinc salts and aluminum salts, including hydrates thereof, preferably barium hydroxide, hydrates of barium hydroxide, barium nitrate, hydrates of barium nitrate, barium phosphate, lithium nitrate, lithium fluoride, barium carbonate, pyrogenic silica, chromium nitrate, zinc oxide and aluminum oxide, to magnesium hydroxide prior to calcination, and then calcining.

As used herein, the term "effective amount" refers to that amount of additive necessary to enhance sintering during calcination of magnesium hydroxide in the manufacture of calcined magnesium oxide. Preferably, at least 0.01 mol %, based on mols of calcined magnesium oxide, of the additive should be used. Most preferably the dosage should be 0.1 to 2.5 mol %. The additives may be added to magnesium hydroxide which will be calcined by any conventional method. The inventor has found it particularly convenient to work with magnesium hydroxide pastes comprising magnesium hydroxide and water in weight ratios sufficiently to give a paste-like consistency. Thus, in a preferred mode, the additives may be blended with a magnesium hydroxide paste prior to calcination; the resulting composition is then calcined.

Pre-calcination addition of the above-listed compounds enables them to be incorporated into the crystalline structure of the resulting calcined magnesium oxide. The additives enhance sintering, i.e., the formation of allotropic crystals, during calcination. Thus, as used herein, the term "calcination-modified magnesium oxide" refers to magnesium oxide prepared by adding the above-listed compounds to magnesium hydroxide, which is then calcined, thereby causing inorganic additives selected from the above-listed group to be incorporated into the cyrstalline structure of the resulting calcined magnesium oxide.

High temperature annealing provides optimum grain growth orientation, which develops the magnetic properties of silicon steel. Annealing is usually carried out in a dry hydrogen atmosphere, at a temperature ranging from about 950° to about 1500° C., for about 2 to about 50 hours. Use of the instant calcination-modified magnesium oxide product prior to annealing minimizes sintering during annealing, thereby reducing "tight magnesia" and improving the magnesium silicate glassy coating formed during annealing.

The percent of calcination-modified magnesium oxide in the coating slurry is preferably 8–15%, by weight. The inorganic compound is preferably at least 0.01 mol %, on a magnesium oxide basis, and most preferably 0.1 to 2.5 mol %, on a magnesium oxide basis. The balance of the slurry is water. Thus, for each 100 mols of magnesium oxide in a slurry which contains 8–15% by weight magnesium oxide, at least 0.01 mol of the inorganic compound is added (prior to calcination) and incorporated into the magnesium oxide crystalline structure. Most preferably, 0.1 to 2.5 mols of the inorganic compound are used.

EXAMPLES

The following examples illustrate the instant invention in greater detail. They are not intended, however, to limit the scope of the instant invention in any way

Examples 1–34

These examples illustrate that the use of calcination-modified magnesium oxide reduces tight magnesia.

Maglite S3334 is calcined mangesium oxide, available from Calgon Corporation, Pittsburgh, PA. The S3334 product, which is prepared by calcining a magnesium hydroxide $(MgOH)_2$ paste, is not prone to sintering during calcination. This calcination property is modified by adding compounds prior to calcination which enhance sintering during calcination. By enhancing sintering during calcination, tight magnesia is reduced.

A magnesium hydroxide paste was prepared by adding 1 part magnesium hydroxide with 3 parts water. This paste was extruded and dried, and then calcined in a muffle furnace at 1000° C. for 5–8 minutes. This calcination resulted in a calcined product having a 60–80 second citric acid activity.

The calcined material was made into a slurry of 180 gm/liter and coated on panels of decarburized silicon steel. The slurry coated steel was then dried at about 200° to 220° C. The resulting coatings had coating weights of about 0.033 ounce/ft$^2$. The coated panels were then annealed in a dry hydrogen atmosphere at about 1150° C. for about 30 hours. The panels were then cooled and scrubbed using nylon brushes and water at about 130° F. After scrubbing, the annealed steel was inspected and the amount of residual magnesium oxide was determined.

In Table I, the following terms are used to describe the performance of calcination-modified magnesium oxides:

Green adherence

Measures the tenacity with which an MgO coating adheres to steel. The adherence is descriptively ranked or it is ranked 1–5 with (1) being very easily brushed off and (5) being tightly adherent.

Annealed adherence

Measures the tenacity with which excess MgO adheres to a glass layer. The adherence is descriptively ranked or it is ranked 1–5 (loose to tight). This is the measure of tight magnesia.

Tight green adherence is very desirable while loose annealed adherence is most desirable. See Table I.

TABLE I

SILICON STEEL PANEL TESTS

| ADDITIVE | Dosage* Wt % (mol %) | GREEN ADHERENCE | ANNEALED ADHERENCE |
|---|---|---|---|
| Titanium Oxide | 5.0 | — | Loose |
| Titanium Oxide | 2.0 | Very tight | Very tight |
| Titanium Oxide | 5.0 | Very tight | Very tight |
| Mg Phosphate | 5.0 | — | Loose |
| Mg Phosphate | 2.0 | Tight | Tight |
| Mg Phosphate | 5.0 | Tight | Tight |
| Chrome Oxide | 2.0 | Very tight | Very tight |
| Chrome Oxide | 5.0 | Very tight | Very tight |
| Colloidal Silica | 2.0 | Tight | Tight |
| Colloidal Silica | 5.0 | Tight | Tight |
| Alumina | 2.0 | Tight | Tight |
| Alumina | 5.0 | Tight | Tight |
| Ca Phosphate | 2.0 | Tight | Tight |
| Ca Phosphate | 5.0 | Tight | Tight |
| Ca Phosphate | 5.0 | — | Tight |
| Ca Mg Phosphate | 2.0 | — | Loose |
| Ca Mg Phosphate | 5.0 | Tight | Loose |
| Barium Carbonate | (0.1) | 3 | 1 |
| Barium Carbonate | (0.5) | 2 | 1 |
| Barium Carbonate | (1.0) | 3 | 1 |
| Barium Hydroxide | (0.1) | 3½ | 1 |
| Barium Hydroxide | (0.5) | | 2 |
| Barium Hydroxide | (1.0) | | 2 |
| Sodium Hydroxide | (0.1) | 4 | 3 |
| Chromium Chloride | (0.1) | 4 | 3 |
| Chromium Chloride | (0.5) | 2 | 2 |
| Chromium Chloride | (1.0) | 4 | 2 |
| Magnesium Carbonate | 1.0 | 5 | — |
| Magnesium Carbonate | 2.5 | 4 | — |
| Magnesium Carbonate | 5.0 | 3 | — |

TABLE I-continued

SILICON STEEL PANEL TESTS

| ADDITIVE | Dosage* Wt % (mol %) | GREEN ADHER-ENCE | ANNEALED ADHERENCE |
|---|---|---|---|
| Barium Phosphate | 1.0 | 4 | 2 |
| Barium Phosphate | 2.5 | 3 | 2 |
| Barium Phosphate | 5.0 | 3 | 1 |
| MAGLITE S-3334 (Comparison Example) | Control | 5 | 5 |

*Magnesium Oxide Basis

Examples 35–41

Table II shows the effect of various pre-calcination additives on the performance of magnesium oxide coatings. Data on coating slurries, as-dried coatings and annealed panels is given.

TABLE II

| Material Tested | Coating Slurry | | | As-Dried Coatings | | | Annealed Panels | |
|---|---|---|---|---|---|---|---|---|
| | pH | Viscosity | Settling | Green Adherence | Coating Weight | Appearance | Annealed Adherence | Appearance |
| Barium Nitrate 1 M % | 12.3 | 27–25 cps | 20% | 1 | 5.3 g/M$^2$ | Thin | 1 | Uniform |
| Barium Hydroxide 1 M % | 11.7 | 30–25 cps | 20% | 1 | 7.5 g/M$^2$ | Thin | 1 | Uniform |
| Chromium Nitrate 1 M % | 10.8 | 170–400 cps | 0 | 5 | 13.6 g/M$^2$ | Uniform | 5 | Pitted Irregular |
| Alumina 1 M % | — | — | — | 5 | 12.8 g/M$^2$ | Thin | 5 | Uniform |
| Zinc Oxide 1 M % | — | — | — | 5 | 11.7 g/M$^2$ | Thin | 5 | Uniform |
| Pyrogenic Silica 1 M % | — | — | — | 5 | 13.4 g/M$^2$ | Uniform | 4 | Uniform |
| No Additive - Control | 10.8 | 25–65 cps | 3% | 5 | 5.9 g/M$^2$ | Uniform-Thin | 5 | Uniform |

What is claimed is:

1. A slurry for use in the initial coating of silicone steel prior to high temperature annealing comprising:

(a) 8–15%, by weight, of a calcination-modified magnesium oxide, wherein said calcination-modified magnesium oxide is prepared by adding at least 0.01 mol percent, on a magnesium oxide basis, of an inorganic compound selected from the group consisting of barium salts, chromium salts, hydrates of barium salts and chronium salts, and pyrogenic silica to magnesium hydroxide prior to calcination, and then calcining; and (b) the balance water.

2. The slurry of claim 1, wherein said slurry comprises 0.1 to 2.0 mol %, on a magnesium oxide basis, or said inorganic compound.

3. A method for coating silicon steel, comprising initially coating the steel, prior to high temperature annealing, with a slurry comprising:

(a) a calcination-modified magnesium oxide, wherein said calcination-modified magnesium oxide slurry is prepared by adding at least 0.1 mol percent, on a magnesium oxide basis, of the compound selected from the group consisting of barium salts, chromium salts, hydrates of barium and chromium salts, and pyrogenic silica to magnesium hydroxide prior to calcination and then calcining; and (b) balance water, and then annealing.

4. The method of claim 3, wherein said annealing is carried out in a dry hydrogen atmosphere at temperatures ranging from approximately 950° to 1500° C. for about 2 to 50 hours.

* * * * *